US008418321B1

(12) United States Patent
Heiman

(10) Patent No.: US 8,418,321 B1
(45) Date of Patent: Apr. 16, 2013

(54) AUXILIARY POLE HANDLE ASSEMBLY

(76) Inventor: Ron Heiman, Sioux Falls, SD (US)

( * ) Notice: Subject to any disclaimer, the term of this patent is extended or adjusted under 35 U.S.C. 154(b) by 0 days.

(21) Appl. No.: 13/468,725

(22) Filed: May 10, 2012

(51) Int. Cl.
*B24F 5/026* (2006.01)
*B25G 1/00* (2006.01)
*A01B 1/026* (2006.01)

(52) U.S. Cl.
USPC .................... 16/426; 16/421; 16/422; 16/436; 81/489; 15/144.1; 15/143.1

(58) Field of Classification Search .................... 16/426, 16/421, 422, 436; 81/489, 177.5, 177.6, 81/177.7; 15/144.1, 143.1; 294/15, 57, 58, 294/153, 154; 42/73, 94
See application file for complete search history.

(56) References Cited

U.S. PATENT DOCUMENTS 271,251 A * 1/1883 Leerbech et al. ................. 42/94
942,077 A * 12/1909 Kener, Jr. ......................... 81/489
1,175,902 A * 3/1916 Peterson ......................... 81/436
1,355,660 A * 10/1920 Farquhar et al. .................. 42/94
1,442,174 A * 1/1923 Oberjohann .................... 81/58.3
1,531,732 A * 3/1925 Burkholder ...................... 74/547
1,587,082 A * 6/1926 Mattern ........................ 473/201
2,551,486 A * 5/1951 Burden ......................... 294/19.2
3,146,481 A * 9/1964 Chiuchiarelli ............... 15/235.8
3,342,229 A * 9/1967 James ............................ 81/63.2
3,863,693 A * 2/1975 Carriker ........................ 81/177.6
4,006,851 A * 2/1977 Kippen .......................... 224/197
4,269,311 A * 5/1981 Rich ............................. 206/234
4,541,310 A * 9/1985 Lindenberger .................... 81/60
4,615,553 A * 10/1986 Hultine ........................... 294/58
4,787,661 A * 11/1988 Rutledge .......................... 294/58
4,932,294 A * 6/1990 Chang ............................. 81/490
4,989,480 A * 2/1991 Chen ............................... 81/439
5,085,433 A * 2/1992 Parsons ......................... 463/47.6
5,133,582 A * 7/1992 Rocha ............................. 294/58
5,347,913 A 9/1994 Stepner
5,431,468 A * 7/1995 Rosenshine ...................... 294/58
5,432,978 A * 7/1995 Menke et al. ................... 16/426
5,465,960 A * 11/1995 Bickerton et al. ........... 463/47.6
5,474,350 A * 12/1995 Gauthier .......................... 294/58
5,487,577 A * 1/1996 Ball ................................ 294/58
5,494,411 A 2/1996 Chuang
5,496,085 A * 3/1996 Middleton ....................... 294/58
5,594,975 A 1/1997 Christen
5,888,137 A * 3/1999 Bukle .......................... 463/47.2
5,921,600 A * 7/1999 Lucas ............................. 294/58
6,017,196 A * 1/2000 Wu ............................... 417/234

(Continued)

FOREIGN PATENT DOCUMENTS

JP 11244211 A * 9/1999

*Primary Examiner* — Victor Batson
*Assistant Examiner* — Jason W San

(57) ABSTRACT

An auxiliary pole handle assembly includes a sleeve positioned on a shaft. A grip is pivotally coupled to the sleeve and includes a tube including a peripheral wall that has an open first end and an open second end. The peripheral wall has a pair of breaks therein. Each of the breaks extends through each of the first and second ends such that first and second portions of the grip are defined. The first and second portions are hingedly coupled together and are positioned in an open condition or in a closed condition. The first end of the grip is pivotally coupled to the sleeve. The grip is releasably positioned in a stored position defined by being in the closed condition extending around the sleeve or the grip is movably positioned into a deployed position extending outwardly away from the sleeve.

7 Claims, 4 Drawing Sheets

U.S. PATENT DOCUMENTS

| | | | | |
|---|---|---|---|---|
| 6,062,619 | A * | 5/2000 | Clark, Jr. | 294/58 |
| 6,260,238 | B1 * | 7/2001 | MacMillan | 16/429 |
| 6,279,435 | B1 * | 8/2001 | Zayat, Jr. | 81/440 |
| 6,398,653 | B1 * | 6/2002 | Chang | 463/47.6 |
| 7,003,849 | B2 * | 2/2006 | Cohen et al. | 16/232 |
| 7,070,218 | B2 * | 7/2006 | Bercaw et al. | 294/15 |
| 7,380,486 | B1 * | 6/2008 | Bean | 89/37.04 |
| 7,571,517 | B2 * | 8/2009 | Smith et al. | 16/436 |
| 7,658,030 | B2 * | 2/2010 | Moody et al. | 42/94 |
| 7,665,241 | B2 * | 2/2010 | Oz | 42/94 |
| 7,669,357 | B2 * | 3/2010 | Moody et al. | 42/72 |
| 7,685,756 | B2 * | 3/2010 | Moody et al. | 42/72 |
| 7,926,136 | B2 * | 4/2011 | Yale et al. | 7/125 |
| 7,926,186 | B2 * | 4/2011 | McLoughlin et al. | 30/244 |
| 7,975,578 | B2 * | 7/2011 | Youtsey | 81/467 |
| 7,987,625 | B1 * | 8/2011 | Moody et al. | 42/94 |
| 8,341,865 | B2 * | 1/2013 | Moody et al. | 42/72 |
| 2003/0061716 | A1 * | 4/2003 | Chen | 30/296.1 |
| 2003/0134699 | A1 * | 7/2003 | Scott | 473/465 |
| 2004/0007887 | A1 * | 1/2004 | Elliott | 294/58 |
| 2004/0075286 | A1 * | 4/2004 | Skowron | 294/58 |
| 2007/0067960 | A1 * | 3/2007 | Lee et al. | 16/421 |
| 2008/0156139 | A1 * | 7/2008 | Lai | 74/551.9 |
| 2009/0255093 | A1 * | 10/2009 | Hsu | 16/421 |
| 2010/0139458 | A1 * | 6/2010 | Mullen et al. | 81/20 |
| 2011/0041657 | A1 * | 2/2011 | Hung | 81/60 |
| 2011/0048180 | A1 * | 3/2011 | Chen | 81/177.7 |
| 2011/0079115 | A1 * | 4/2011 | Johnson et al. | 81/63.1 |
| 2011/0265366 | A1 * | 11/2011 | Hinds, Jr. | 42/94 |
| 2012/0031447 | A1 * | 2/2012 | Lai | 135/75 |
| 2012/0186126 | A1 * | 7/2012 | Bartak | 42/94 |
| 2012/0266513 | A1 * | 10/2012 | Gnesda et al. | 42/72 |

* cited by examiner

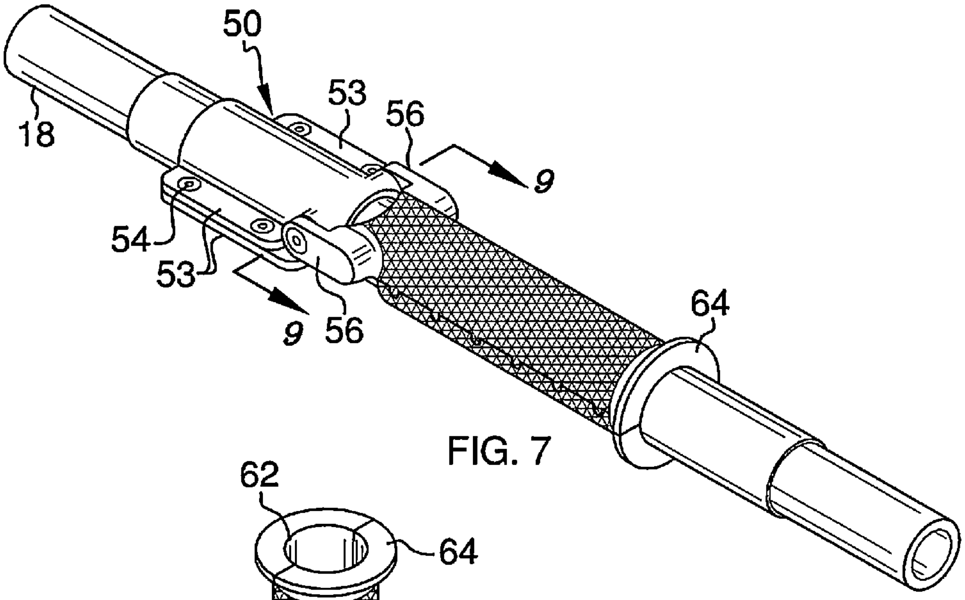
FIG. 7
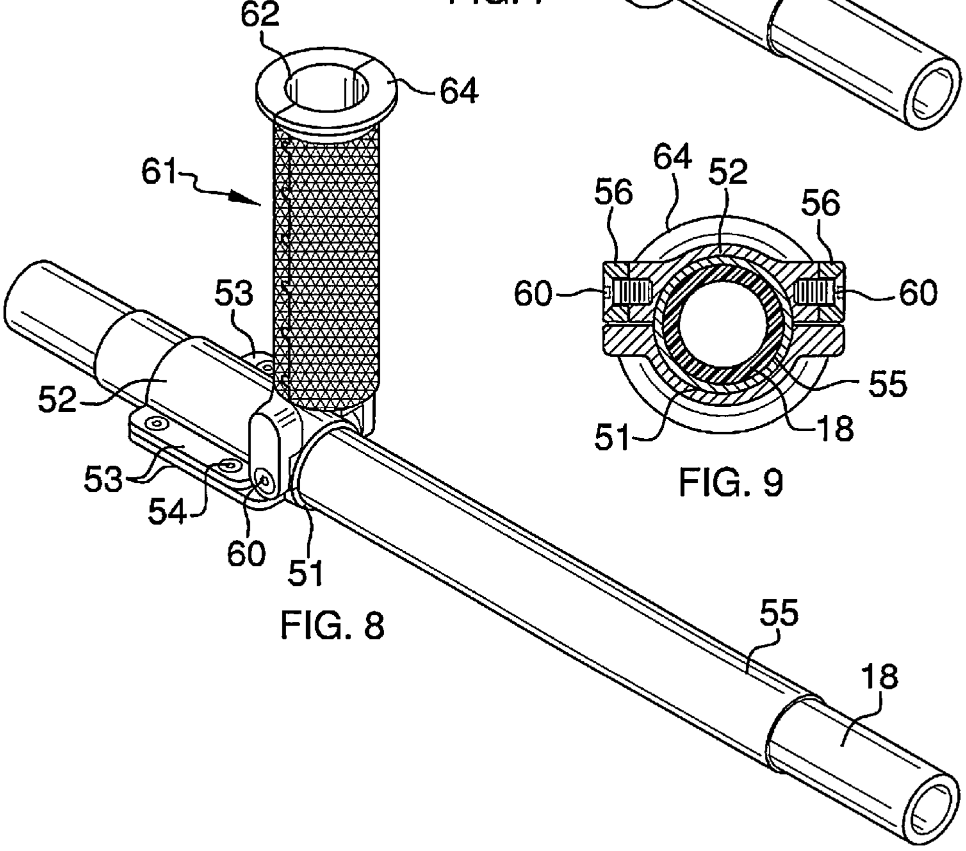
FIG. 8
FIG. 9

AUXILIARY POLE HANDLE ASSEMBLY

BACKGROUND OF THE DISCLOSURE

Field of the Disclosure

The disclosure relates to retrofitted pole gripping devices and more particularly pertains to a new retrofitted pole gripping device for positioning on a pole, shaft or the like to provide a handle that may be used while manipulating the pole to provide additional leverage and control for a manipulator of the pole.

SUMMARY OF THE DISCLOSURE

An embodiment of the disclosure meets the needs presented above by generally comprising a sleeve that has a perimeter wall and a pair of opposed ends. The sleeve is positionable on a shaft so that the shaft extends through the opposed ends. A grip is pivotally coupled to the sleeve. The grip comprises a tube including a peripheral wall that has an open first end and an open second end. The peripheral wall has a pair of breaks therein. Each of the breaks extends through each of the first and second ends such that a first portion and a second portion of the grip are defined. The first and second portions are hingedly coupled together and are positioned in an open condition or in a closed condition. The first end of the grip is pivotally coupled to the sleeve. The grip is releasably positioned in a stored position defined by being in the closed condition extending around the sleeve or the grip is movably positioned into a deployed position extending outwardly away from the sleeve and in the closed condition. The grip is placed in the open condition when moving the grip between the stored and deployed positions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 7 is a top perspective view of an embodiment of the disclosure.

FIG. 8 is a top perspective view of an embodiment of the disclosure.

FIG. 9 is a cross-sectional view of an embodiment of the disclosure taken along line 9-9 of FIG. 7.

DESCRIPTION OF THE PREFERRED EMBODIMENT

Figure 1:
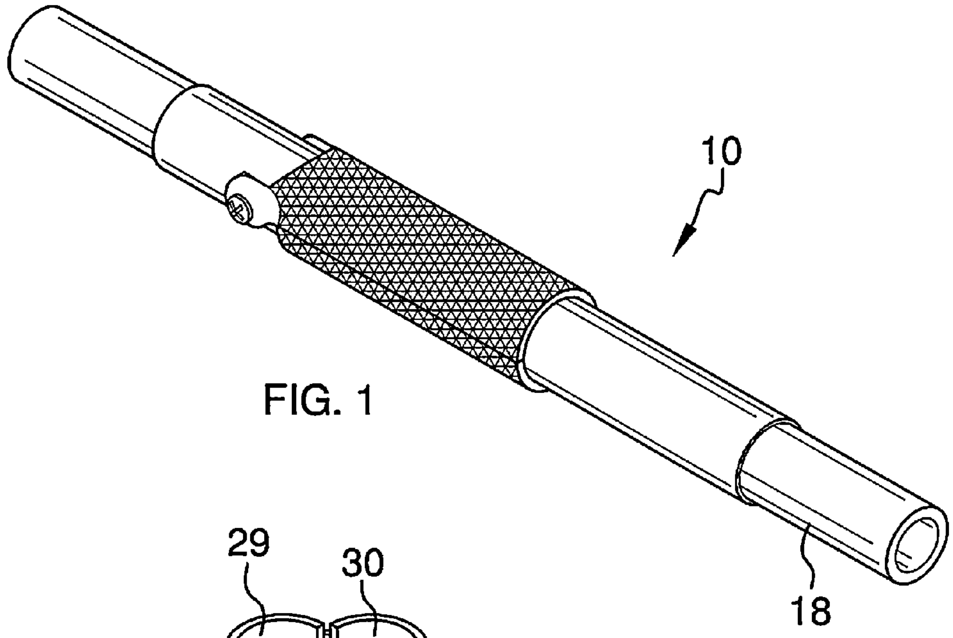
FIG. 1 is a top perspective view of an auxiliary pole handle assembly according to an embodiment of the disclosure.

With reference now to the drawings, and in particular to FIGS. 1 through 9 thereof, a new retrofitted pole gripping device embodying the principles and concepts of an embodiment of the disclosure and generally designated by the reference numeral 10 will be described.

As best illustrated in FIGS. 1 through 9, the auxiliary pole handle assembly 10 generally comprises a sleeve 12 that has a perimeter wall 14 and a pair of opposed ends 16, 17. The sleeve 12 is positionable on a shaft 18 such that the shaft 18 extends through the opposed ends 16,17. It should be understood that that shaft 18 may take any form of pole, rod or the like which is typically gripped by a person while manipulating an elongated hand tool. It should be understood that the shaft 18 in the Figures is only a partial representation of an entire shaft for which the assembly 10 would be utilized. One particular shaft 18 on which the sleeve 12 may be positioned is a pike pole utilized by firefighters for pushing in walls, twisting through rafters and pulling down ceiling sheetrock. Such poles are typically stored within tubular housings mounted on emergency vehicles. The poles are slid into the tubular housing until the head of the tool, such as a rubbish hook, pile pole hook, drywall hook or the like, abuts the opening of the tubular housing. These tubular housings only afford slightly more space than the diameter of the pole itself and handles that extend laterally away from the pole cannot be mounted on these poles since such handles would not fit in the tubular housing.

Figure 2:
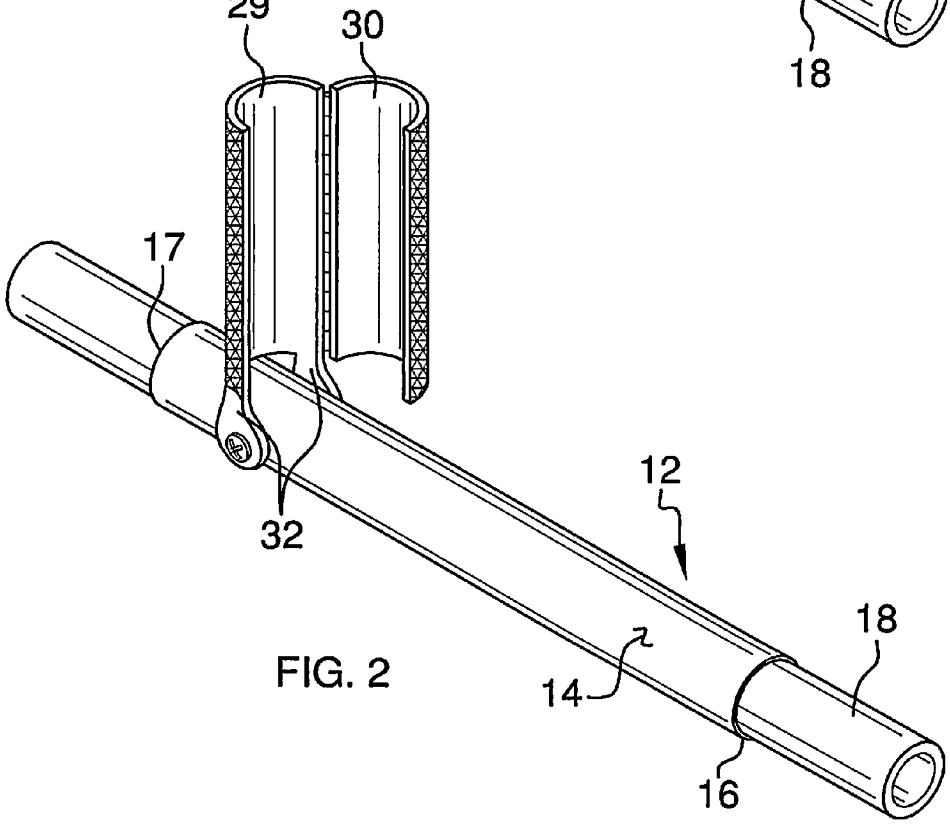
FIG. 2 is a top perspective view of an embodiment of the disclosure.
Figure 3:
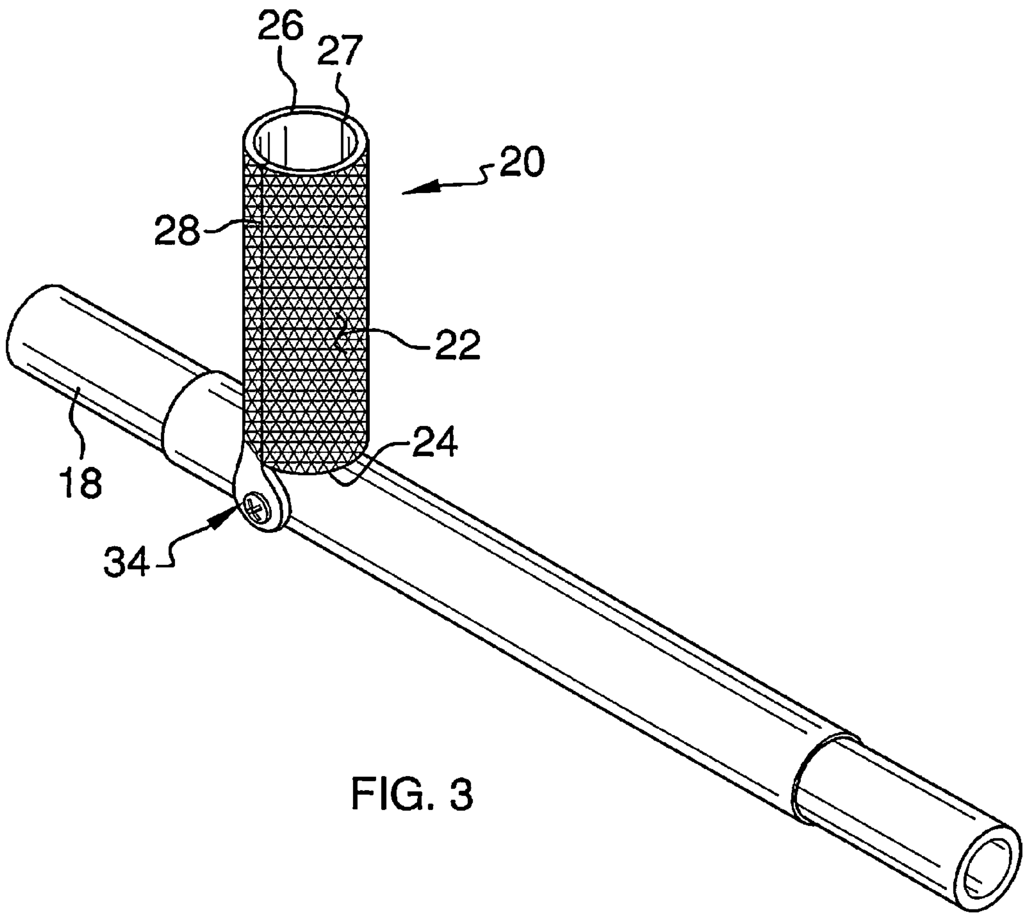
FIG. 3 is a top perspective view of an embodiment of the disclosure.

As shown in the Figures, the assembly 10 includes a grip 20 that is pivotally coupled to the sleeve 12. The grip 20 comprises a tube including a peripheral wall 22 having an open first end 24 and an open second end 26. The peripheral wall 22 has a pair of breaks 27, 28 therein and each of the breaks extends through each of the first 24 and second 26 ends such that a first portion 29 and a second portion 30 of the grip 20 are defined. The first 29 and second 30 portions are hingedly coupled together and are positioned in an open condition or in a closed condition. The first end 24 of the grip 20 is pivotally coupled to the sleeve 12. The grip 20 is releasably positioned in a stored position defined by being in the closed condition and extending around the sleeve 12 as shown in FIG. 1 or the grip 20 is movably positioned into a deployed position extending outwardly away from the sleeve 12 and in the closed condition as shown in FIG. 3. The grip 20 is placed in the open condition when moving the grip 20 between the stored and deployed positions as shown in FIG. 2 and it is the ability to open or close the first 29 and second 30 portions relative to each other which allows the grip 20 to form a closed loop handle while also being positioned around the sleeve 12 when not in use. When the grip 20 is in the stored position, the pole, along with the sleeve 12 and grip 20, can be extended into the tubular housing thus allowing convenient storage whole providing a handle when needed. It should be understood that even when grip 20 is in the stored position, it will provide better friction between shaft 18 and the user's hand than would the shaft 18 by itself. To this end, an outer surface of the peripheral wall 22 may be knurled or roughened in some manner to increase its coefficient of friction. The friction may be further increased by altering the materials with which the grip is constructed or includes. Thus, the grip 20 and the sleeve 12 may be comprised of plastics, metals, carbon composites, elastomers or any other suitable material (s).

Figures 4, 5, 6:
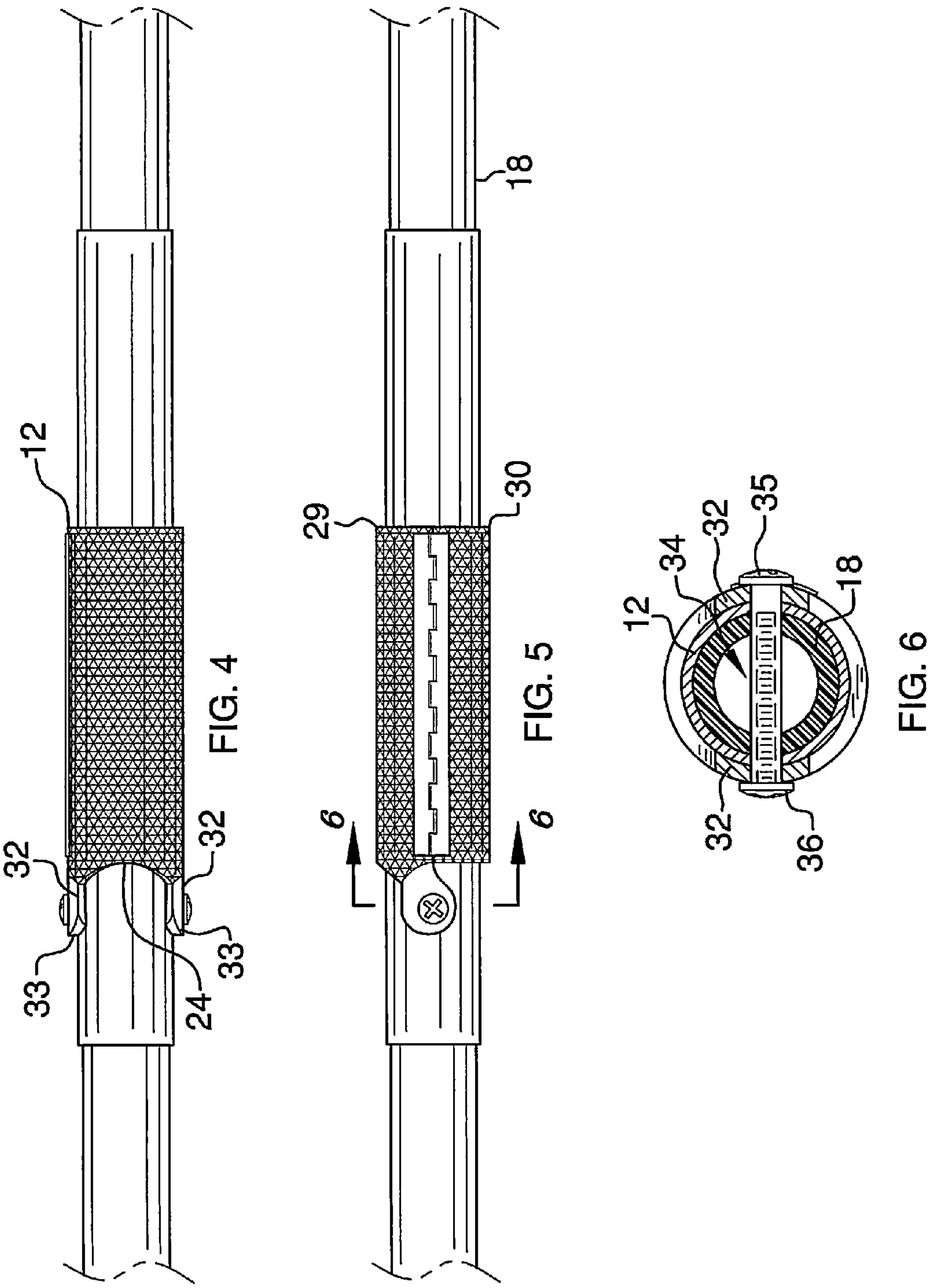
FIG. 4 is a top view of an embodiment of the disclosure.
FIG. 5 is a bottom view of an embodiment of the disclosure.
FIG. 6 is a cross-sectional view of an embodiment of the disclosure taken along line 6-6 of FIG. 5.

The grip 20 further includes a pair of arms 32. Each of the arms 32 is attached to the first end 26 of the first portion 29 and extends away from the grip 20 in a generally same direction with respect to each other. The arms 32 each have a distal end 33 with respect to the grip 20. The arms 32 are each pivotally coupled to the sleeve 12 adjacent to respective ones of the distal ends 33 to facilitate movement of the peripheral wall 22 between the stored and deployed positions. As shown in FIG. 6, a pivot pin 34 extends through the sleeve 12 and each of the arms 32. This pivot pin 34 may further extend through the shaft 18 to lock the position of the sleeve 14 with respect to the shaft 18. The pivot pin 34 may include a female receiver 35 threadably coupled a male fastener 36 to allow the pivot pin 34 to be removed as needed.

Once the grip 20 is extended outwardly from the shaft 18, the grip 20 forms a generally perpendicular angle with respect to the sleeve 12. More particularly, an axis of the grip 20 extending through the first 24 and second 26 ends forms an angle with a longitudinal axis of the sleeve 12 extending through the opposed ends 16, 17 between 80° and 100° when the grip 20 is in the deployed position. The pair of breaks 27, 27 may lie in a plane bisecting the grip 20 into the first 29 and second 30 portions. Because the first end 24 of the first portion 29 is moved toward the shaft 18 and sleeve 12 due to the arms 32 being pivotally coupled to the sleeve 12, it may be beneficial to place the sleeve 12 at a point where force upon the grip 20 is better utilized when the first end 24 of the first portion 29 is being urged or biased toward the sleeve 12. The first end 24 of the first portion 29 may be concavely arcuate as best seen in FIG. 4 to conform to a cylindrical shape of the sleeve 12 when the grip 20 is in the deployed position. Thus, the force of the first portion 29 on the sleeve 12 will be spread out along the first end 24 of the first portion 29 to prevent damage to either the first portion 29 or the sleeve 12.

In use, the sleeve 12 is positioned on the shaft 18 of the hand tool where desired such that when the grip 20 is utilized it will be located for convenient use. When the grip 20 is being used, it is laterally extended outwardly from the sleeve 12 to increase the amount of force and leverage, and in particular the rotational force, that may be applied to the shaft 18 by the user of the shaft 18. When the grip 20 is not being used, the first 29 and second 30 portions are opened up and the grip 20 folded against the sleeve 12, or shaft 18, and the first 29 and second 30 portions closed around the shaft 18.

FIGS. 7-9 show an embodiment which does not require the pivot pin 34 to extend through the shaft 18. This embodiment further includes a modified sleeve 50 compared to that shown in FIGS. 1-6. This embodiment features a sleeve 50 which is also divided into a first section 51 and a second section 52 to avoid extending the pivot pin 36 through the shaft 18. The first 51 and second 52 sections each include oppositely extending flanges 53 through which fasteners 54 can be extended to secure such into a tubular shape. A covering 55 may be positioned on the shaft 18 between the shaft 18 and the sleeve 50 to increase friction between the sleeve 50 and the shaft 18. Alternatively, an inner surface of the sleeve 50 may include an elastomer or other high friction material to better grip the shaft 18 as needed. The arms 56 of the grip 61 are attached to opposite sides of the sleeve 50 by separate pins 60. This embodiment may further include the sleeve 50 with a knurled outer surface or other features described above to increase the coefficient of friction of the sleeve. A second end 62 of the grip 61, while generally having a same construction as described above, may include an outwardly extending shoulder 64 against which a user may abut their hand to prevent their hand from sliding laterally off of the grip 61. As can be seen in the Figures, this embodiment may allow for the grip 61 to extend directly around the shaft 18, as opposed to the sleeve 50, though the embodiment of FIG. 1 may likewise be modified to also allow for encirclement directly of the shaft 18 as opposed to the sleeve 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A grip assembly configured for mounting on shaft, said grip assembly including:

a sleeve having a perimeter wall and a pair of opposed ends, said sleeve being positionable on a shaft such that the shaft extends through said opposed ends;

a grip being pivotally coupled to said sleeve, said grip comprising a tube including a peripheral wall having an open first end and an open second end, said peripheral wall having a pair of breaks therein, each of said breaks extending through each of said first and second ends such that a first portion and a second portion of said grip is defined, said first and second portions being hingedly coupled together and being positioned in an open condition or in a closed condition; and said first end of said grip being pivotally coupled to said sleeve, said grip being releasably positioned in a stored position defined by being in said closed condition and extending around said sleeve or said grip being movably positioned into a deployed position extending outwardly away from said sleeve and in said closed condition, said grip being placed in said open condition when moving said grip between said stored and deployed positions.

2. The grip assembly according to claim 1, wherein said grip includes a pair of arms, each of said arms being attached to said first end of said first portion and extending away from said grip in a generally same direction with respect to each other, said arms each having a distal end with respect to said grip, said arms each being pivotally coupled to said sleeve adjacent to respective ones of said distal ends to facilitate movement of said peripheral wall between said stored and deployed positions.

3. The grip assembly according to claim 2, further including a pivot pin extending through said sleeve and each of said arms.

4. The grip assembly according to claim 1, wherein an axis of said grip extending through said first and second ends forms an angle with a longitudinal axis of said sleeve extending through said opposed ends between 80° and 100° when said grip is in said deployed position.

5. The grip assembly according to claim 2, wherein said pair of breaks lie in a plane bisecting said grip into said first and second portions, said first end of said first portion being concavely arcuate and conforming to a cylindrical shape of said sleeve when said grip is in said deployed position.

6. The grip assembly according to claim 1, wherein an outer surface of said peripheral wall is knurled.

7. A grip assembly configured for mounting on shaft, said grip assembly including:

a sleeve having a perimeter wall and a pair of opposed ends, said sleeve being positionable on a shaft such that the shaft extends through said opposed ends;

a grip being pivotally coupled to said sleeve, said grip comprising a tube including a peripheral wall having an open first end and an open second end, said peripheral wall having a pair of breaks therein, each of said breaks extending through each of said first and second ends such that a first portion and a second portion of said grip is defined, said first and second portions being hingedly coupled together and being positioned in an open condition or in a closed condition;

said first end of said grip being pivotally coupled to said sleeve, said grip being releasably positioned in a stored position defined by being in said closed condition and extending around said sleeve or said grip being movably positioned into a deployed position extending outwardly away from said sleeve and in said closed condition, said grip being placed in said open condition when moving said grip between said stored and deployed positions;

said grip including a pair of arms, each of said arms being attached to said first end of said first portion and extending away from said grip in a generally same direction with respect to each other, said arms each having a distal end with respect to said grip, said arms each being pivotally coupled to said sleeve adjacent to respective ones of said distal ends to facilitate movement of said peripheral wall between said stored and deployed positions, a pivot pin extending through said sleeve and each of said arms;

an axis of said grip extending through said first and second ends forming an angle with a longitudinal axis of said sleeve extending through said opposed ends between 80° and 100° when said grip is in said deployed position;

said pair of breaks lying in a plane bisecting said grip into said first and second portions, said first end of said first portion being concavely arcuate and conforming to a cylindrical shape of said sleeve when said grip is in said deployed position; and an outer surface of said peripheral wall being knurled.

* * * * *